(12) United States Patent
Walker

(10) Patent No.: US 8,672,075 B1
(45) Date of Patent: Mar. 18, 2014

(54) VEHICLE ASSEMBLY

(76) Inventor: Sean H. Walker, Fresno, CA (US)

( * ) Notice: Subject to any disclaimer, the term of this patent is extended or adjusted under 35 U.S.C. 154(b) by 58 days.

(21) Appl. No.: 13/421,236

(22) Filed: Mar. 15, 2012

(51) Int. Cl.
*B62K 5/007* (2013.01)
*B62K 5/08* (2006.01)
*B62M 6/40* (2010.01)

(52) U.S. Cl.
USPC ...... 180/206.1; 208/267; 208/282; 208/288.1

(58) Field of Classification Search
USPC ............... 280/282, 234, 267, 259, 260, 261, 280/288.1; 180/220, 206.1
See application file for complete search history.

(56) References Cited

U.S. PATENT DOCUMENTS

| | | | |
|---|---|---|---|
| 3,498,634 A | 3/1970 | Sheldon | |
| 4,639,007 A * | 1/1987 | Lawrence | 280/234 |
| 4,674,762 A | 6/1987 | Nelson et al. | |
| 4,749,207 A * | 6/1988 | Oh | 280/247 |
| 5,326,121 A * | 7/1994 | Fisher | 280/282 |
| 6,024,186 A | 2/2000 | Suga | |
| 6,170,844 B1 | 1/2001 | Sasi | |
| 6,203,043 B1 | 3/2001 | Lehman | |
| 6,315,314 B1 * | 11/2001 | Frey | 280/282 |
| 6,554,308 B2 | 4/2003 | Black | |
| D478,846 S * | 8/2003 | Sauter | D12/107 |
| D485,214 S | 1/2004 | Sauter | |
| 6,932,370 B2 | 8/2005 | Jones et al. | |
| 7,223,210 B2 | 5/2007 | Krul et al. | |
| 7,661,501 B1 * | 2/2010 | Perdue | 180/210 |
| 7,669,864 B2 * | 3/2010 | Rawlinson | 280/124.103 |
| 7,914,422 B1 * | 3/2011 | Villanueva | 482/66 |
| 7,946,963 B1 * | 5/2011 | Schreiner | 482/57 |
| 2011/0006500 A1 * | 1/2011 | Rush | 280/267 |

* cited by examiner

*Primary Examiner* — Anne Marie Boehler

(57) ABSTRACT

A vehicle assembly is provided for facilitating transportation in a stable vehicle not requiring government licensing. The assembly includes a frame assembly having a left frame coupled to a right frame. The frame assembly has a center frame coupled to and positioned between the left frame and the right frame. A plurality of wheels is coupled to the frame assembly including a left front wheel and a left back wheel coupled to the left frame and a right front wheel and a right back wheel coupled to the right frame. A seat assembly is positioned between the left frame and the right frame. A steering mechanism is coupled to the frame assembly and mechanically coupled to the left front wheel and the right front wheel. A drive system is operationally coupled to at least one of the plurality of wheels.

15 Claims, 5 Drawing Sheets

# VEHICLE ASSEMBLY

BACKGROUND OF THE DISCLOSURE

Field of the Disclosure

The disclosure relates to personal transportation devices and more particularly pertains to a new personal transportation device for facilitating transportation in a stable vehicle not requiring government licensing.

SUMMARY OF THE DISCLOSURE

An embodiment of the disclosure meets the needs presented above by generally comprising a frame assembly having a left frame coupled to a right frame. The frame assembly has a center frame coupled to and positioned between the left frame and the right frame. A plurality of wheels is coupled to the frame assembly including a left front wheel and a left back wheel coupled to the left frame and a right front wheel and a right back wheel coupled to the right frame. A seat assembly is positioned between the left frame and the right frame. A steering mechanism is coupled to the frame assembly and mechanically coupled to the left front wheel and the right front wheel. A drive system is operationally coupled to at least one of the plurality of wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
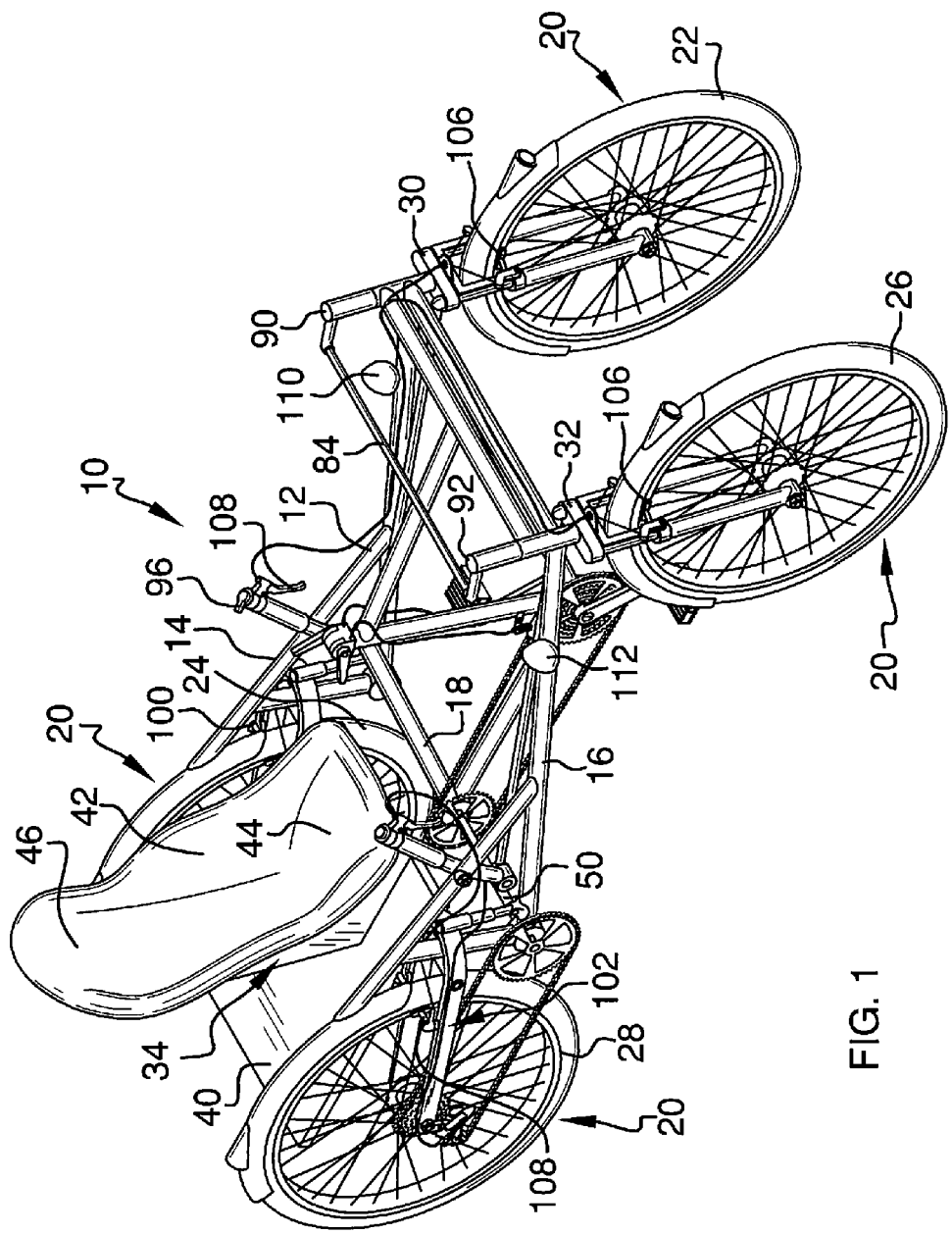
FIG. 1 is a top front side perspective view of a vehicle assembly according to an embodiment of the disclosure.
Figure 2:
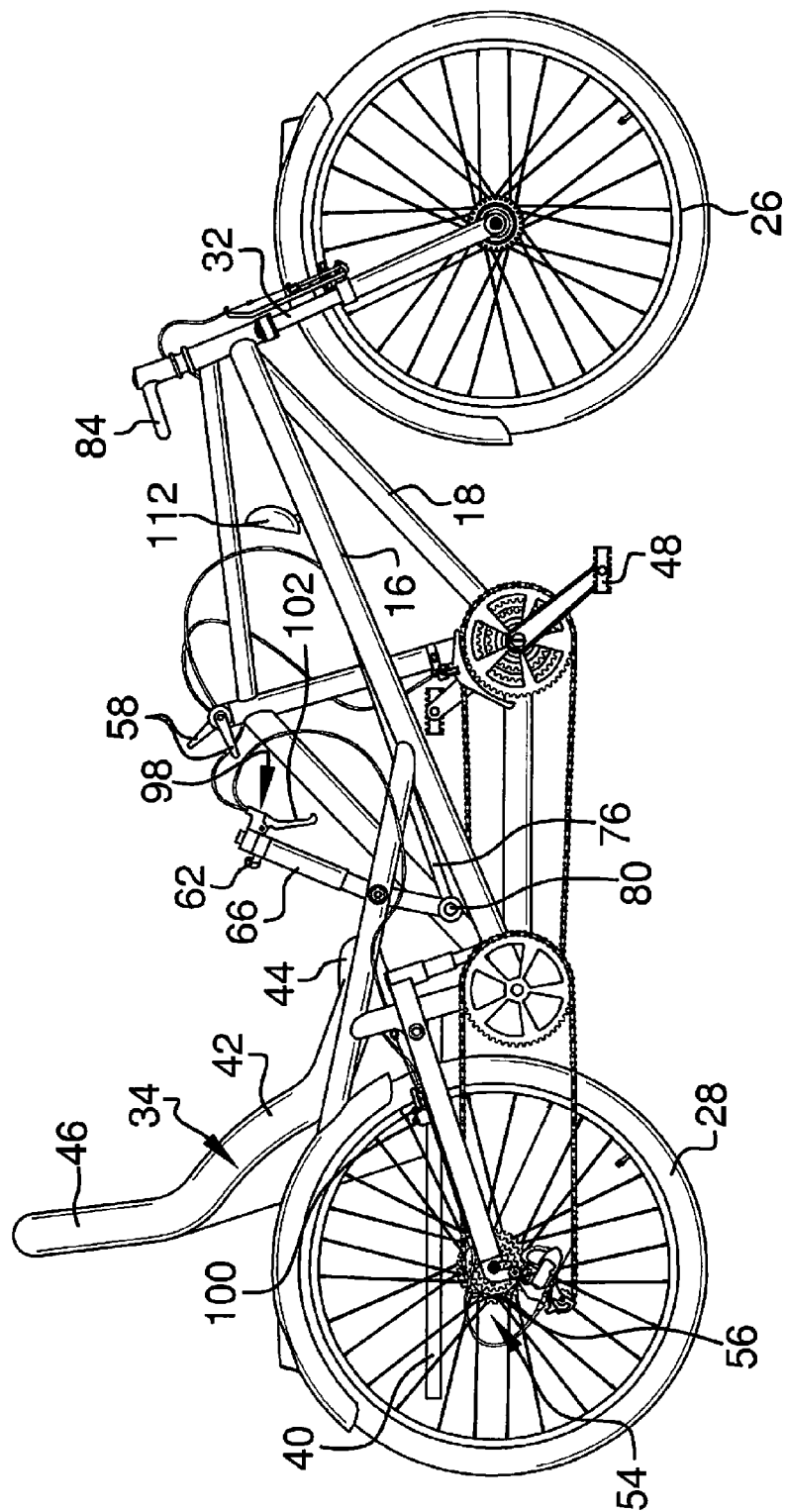
FIG. 2 is a side view of an embodiment of the disclosure.
Figure 3:
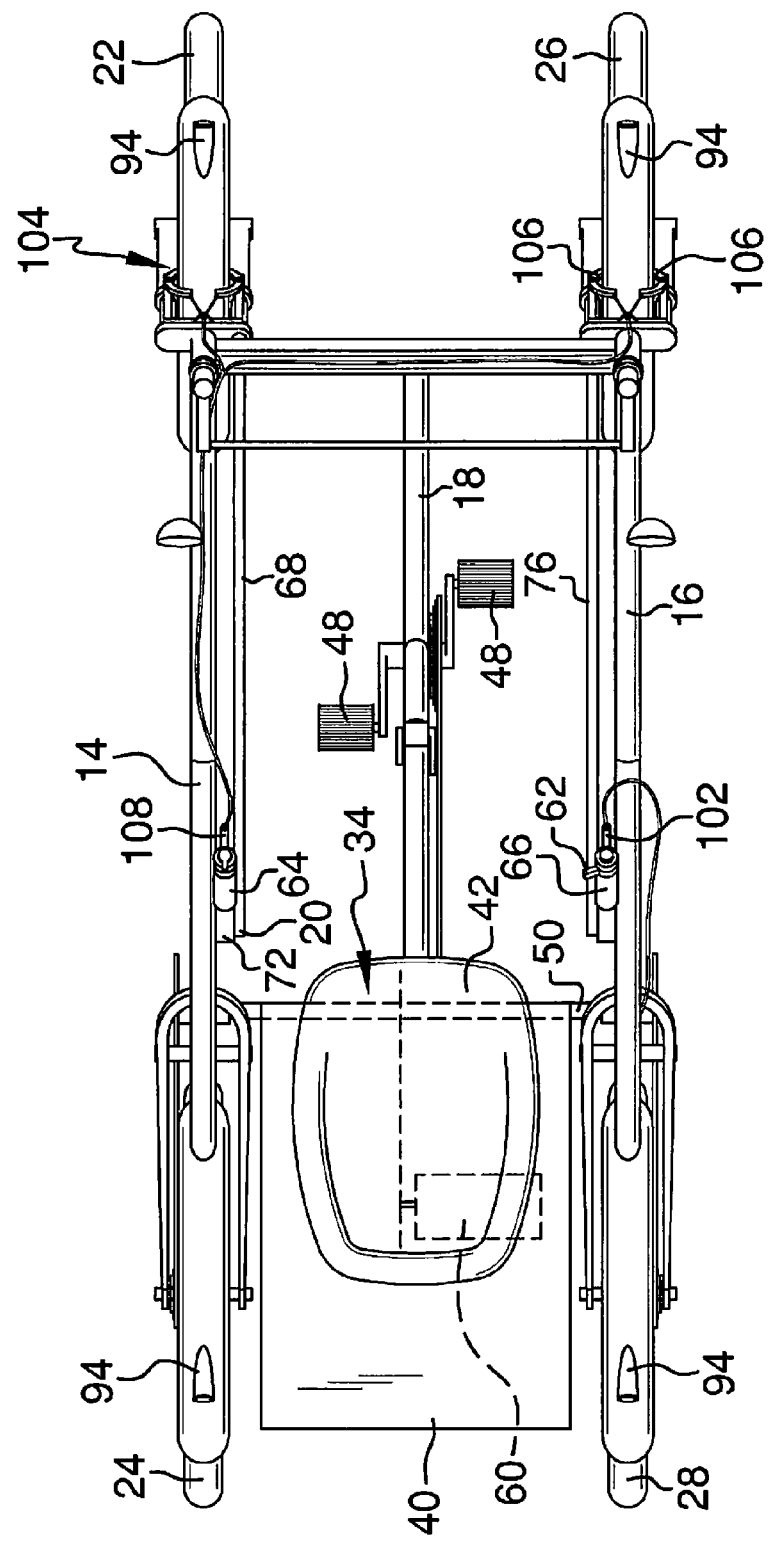
FIG. 3 is a top view of an embodiment of the disclosure.
Figure 4:
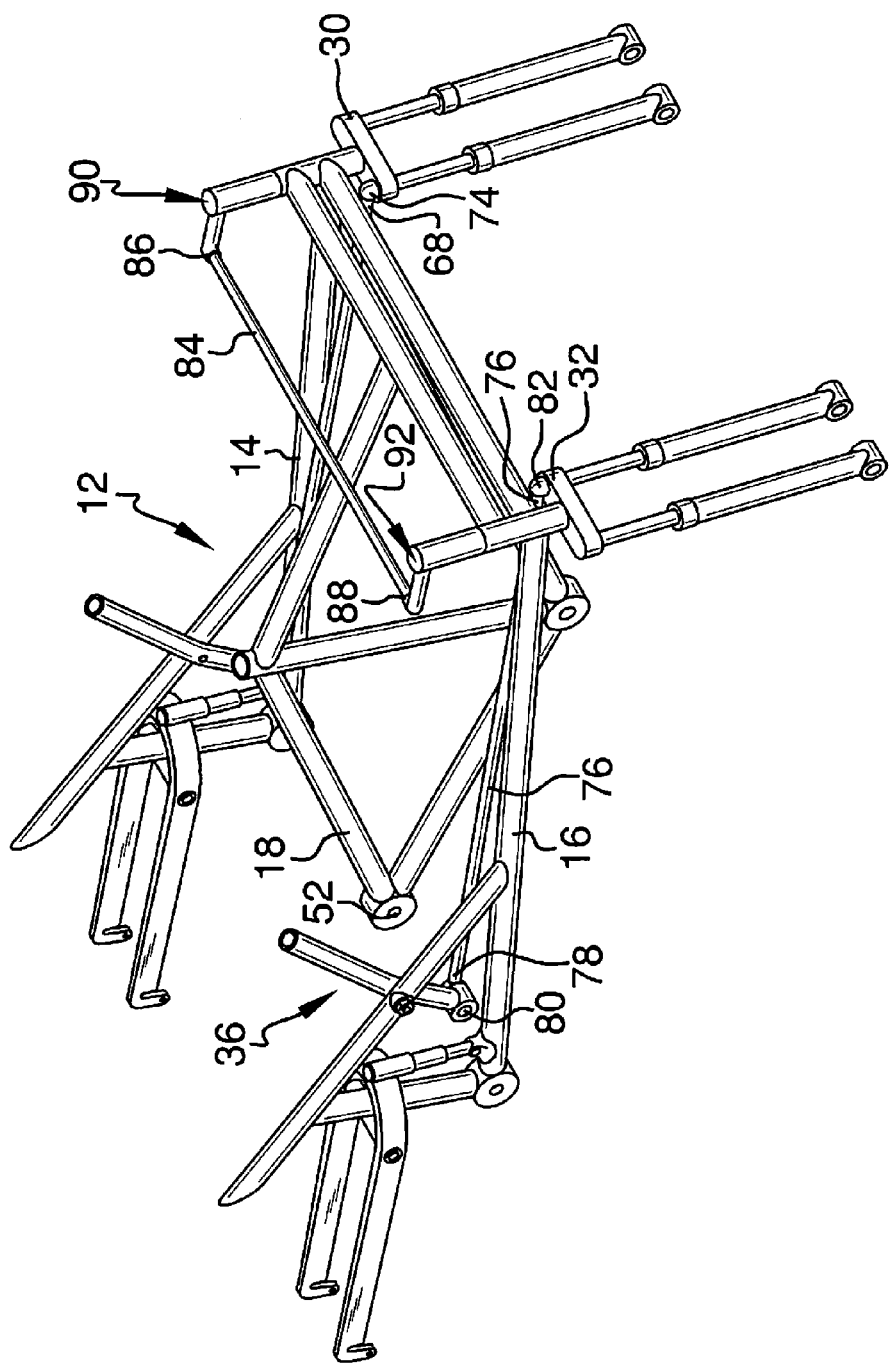
FIG. 4 is a top front side perspective view of a frame assembly of an embodiment of the disclosure.
Figure 5:
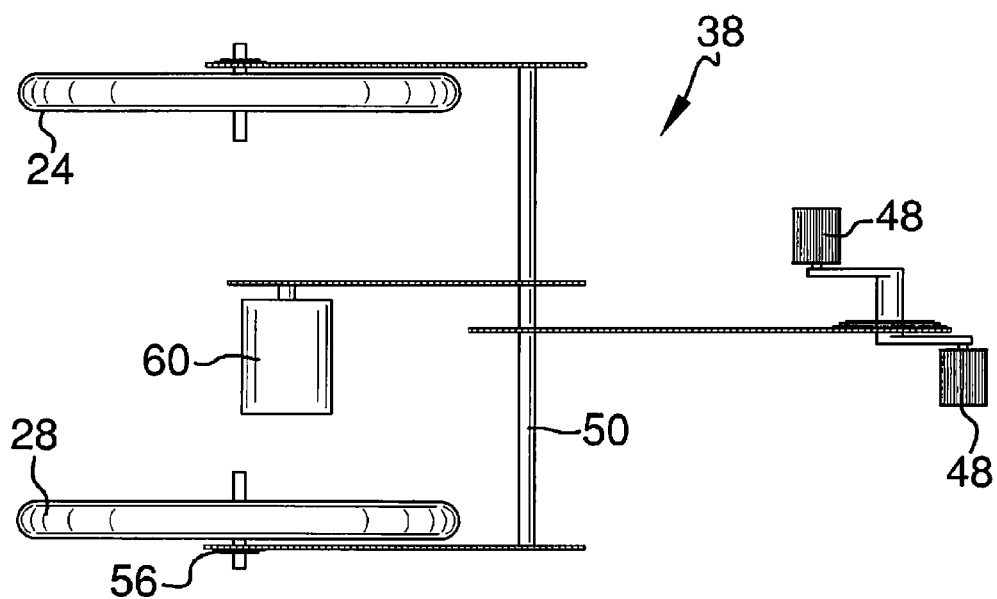
FIG. 5 is a top view of a drive system of an embodiment of the disclosure.

With reference now to the drawings, and in particular to FIGS. 1 through 5 thereof, a new personal transportation device embodying the principles and concepts of an embodiment of the disclosure and generally designated by the reference numeral 10 will be described.

As best illustrated in FIGS. 1 through 5, the vehicle assembly 10 generally comprises a frame assembly 12 having a left frame 14 coupled to a right frame 16. The left frame 14 and right frame 16 are laterally aligned and may have similar structure to each other. The left frame 14 and right frame 16 may each further be similar to an elongated recumbent bicycle frame. The frame assembly 12 further has a center frame 18 coupled to and positioned between the left frame 14 and the right frame 16. A plurality of wheels 20 is coupled to the frame assembly 12. The plurality of wheels 20 includes a left front wheel 22 and a left back wheel 24 coupled to the left frame 14. The plurality of wheels 20 includes a right front wheel 26 and a right back wheel 28 coupled to the right frame 16. A left front fork 30 is pivotally coupled to the left frame 14. The left front wheel 22 is coupled to the left front fork 30. Similarly, a right front fork 32 is pivotally coupled to the right frame 16 and the right front wheel 26 is coupled to the right front fork 32.

A seat assembly 34 is coupled to the frame assembly 12. The seat assembly 34 is positioned between the left frame 14 and the right frame 16. A steering mechanism 36 is coupled to the frame assembly 12. The steering mechanism 36 is mechanically coupled to the left front wheel 22 and the right front wheel 26. A drive system 38 is coupled to the frame assembly 12. The drive system 38 is operationally coupled to the left back wheel 24 and the right back wheel 28. A platform 40 is coupled to the frame assembly 12. The platform 40 is positioned between the left frame 14 and the right frame 16. The platform 40 may extend rearwardly of the seat assembly 34. The seat assembly 34 may be a bucket seat 42 having a bottom portion 44 configured for supporting a person and a back portion 46 extending upwardly from the bottom portion 44. The seat 42 is aligned with the center frame 18.

The drive system 38 includes pair of pedals 48 coupled to the center frame 18 in front of the seat 42. The drive system 38 also includes a main axle 50 coupled to the frame assembly 12 extending from the left frame 14 through a rear aperture 52 in the center frame 18 to the right frame 16. The main axle 50 is operationally coupled to the pedals 48 whereby the pedals 48 may be pedaled by the person seated on the seat 42 to urge the main axle 50 to rotate. The main axle 50 is operationally coupled to the left back wheel 24 and the right back wheel 28. A gear system 54 is coupled to the frame assembly 12 including a plurality of gears 56 which is operationally coupled to the left back wheel 24 and the right back wheel 28. A gear switch 58 may incorporate a dial or pivoted arms coupled to the frame assembly 12. The gear switch 58 may be positioned on center frame 18 in front of the seat 42. The gear switch 58 is operationally coupled to the gear system 54 for selectively switching gears 56. A motor 60 may be coupled to or incorporated into the drive system 38. The motor 60 is coupled to the frame assembly 12 beneath and behind the seat 42, preferably under the platform 40. The motor 60 is operationally coupled to the main axle 50 to provide powered rotation of the main axle 50 or to supplement rotation provided by the pedals 48. A throttle control 62 is coupled to the frame assembly 12 and operationally coupled to the motor 60.

The steering mechanism 36 includes a left handle 64 which is pivotally coupled to the left frame 14. The steering mechanism 36 also includes a right handle 66 which is pivotally coupled to the right frame 16. A left steering rod 68 of the steering mechanism 36 has a first end 70 coupled to a lower end 72 of the left handle 64. The left steering rod 68 also has a second end 74 coupled to the left front fork 30 whereby pivoting of the left handle 64 pivots the left front fork 30 relative to the left frame 14. Similarly, the steering mechanism 36 includes a right steering rod 76 having a first end 78 coupled to a lower end 80 of the right handle 66. The right steering rod 76 has a second end 82 coupled to the right front fork 32 whereby pivoting of the right handle 66 pivots the right front fork 32 relative to the right frame 16. A tie rod 84 has a first end 86 pivotally coupled to the left front fork 30 and a second end 88 pivotally coupled to the right front fork 32. The tie rod 84 is positioned offset from a pivot point 90 of the left front fork 30 and a pivot point 92 of the right front fork 32 such that pivoting of the left front fork 30 and the right front fork 32 is coordinated.

A plurality of lights 94 may be coupled to the frame assembly 12. A turn switch 96 is coupled to the frame assembly 12 and operationally coupled to each of the lights 94 permitting manipulation of the turn switch 96 to selectively activate the lights 94 in a blinking pattern indicating an intended direction of travel.

A rear brake assembly 98 is coupled to the frame assembly 12. The rear brake assembly 98 includes rear calipers 100 coupled to the frame assembly 12. The rear calipers 100 are positioned adjacent to the left back wheel 24 and the right back wheel 28. The rear calipers 100 selectively engage the left back wheel 24 and the right back wheel 28 inhibiting rotation of the left back wheel 24 and the right back wheel 28. A rear brake actuator 102 of the rear brake assembly 98 is coupled to the right handle 66 as is conventional with bicycles but may also be coupled to the left handle 64 instead. The rear brake actuator 102 is operationally coupled to the rear calipers 100 transferring a squeezing action to engage the rear calipers 100 to the left back wheel 24 and the right back wheel 28. A front brake assembly 104 may also be coupled to the frame assembly 12. The front brake assembly 104 has front calipers 106 coupled to the frame assembly 12 by attachment to the left front fork 30 and the right front fork 32 adjacent to the left front wheel 22 and the right front wheel 26. The front calipers 106 selectively engage the left front wheel 22 and the right front wheel 26 whereby rotation of the left front wheel 22 and the right front wheel 26 is inhibited. A front brake actuator 108 of the front brake assembly 104 is coupled to the left handle 64 or the right handle 66 opposite the rear brake actuator 102. The front brake actuator 108 is operationally coupled to the front calipers 106. A left mirror 110 may be coupled to the left frame 14 and a right mirror 112 may be coupled to the right frame 16.

In use, a person positions himself or herself on the seat 42 placing feet on the pedals 48 and grasping the left handle 64 and right handle 66. Pedaling the pedals 48 produces forward motion. The forward motion may also be provided by or supplemented by manipulation of the throttle control 62. Steering is performed by pivoting of the left handle 64 and the right handle 66. The steering may be coordinated by the tie rod 84.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle assembly comprising:
   a frame assembly having a left frame coupled to a right frame, said frame assembly having a center frame coupled to and positioned between said left frame and said right frame;
   a plurality of wheels coupled to said frame assembly, said plurality of wheels including a left front wheel and a left back wheel coupled to said left frame, said plurality of wheels including a right front wheel and a right back wheel coupled to said right frame, said left back wheel and said right back wheel being laterally aligned wherein said left back wheel and said right back wheel have a common central axis;
   a platform coupled to said frame assembly, said platform being positioned between said left frame and said right frame and aligned between said left back wheel and said right back wheel;
   a seat assembly coupled to said frame assembly, said seat assembly being positioned between said left frame and said right frame, said seat assembly including a bucket seat coupled to and aligned with said center frame, said bucket seat being positioned over a forward portion of said platform, a back portion of said bucket seat extending upwardly relative to said platform, said back portion of said seat being positioned directly between said left back wheel and said right back wheel forward of said common central axis of said left back wheel and said right back wheel;
   a steering mechanism coupled to said frame assembly, said steering mechanism being mechanically coupled to said left front wheel and said right front wheel; and
   a drive system operationally coupled to one of said plurality of wheels.

2. The assembly of claim 1, further including said left frame and said right frame being laterally aligned.

3. The assembly of claim 1, further including said drive system being coupled to said left back wheel and said right back wheel.

4. The assembly of claim 1, further comprising:
   said drive system including a pair of pedals coupled to said center frame;
   said drive system including a main axle coupled to said frame assembly, said main axle being operationally coupled to said pedals whereby said pedals urge said main axle to rotate; and
   said main axle being operationally coupled to said left back wheel and said right back wheel.

5. The assembly of claim 4, further comprising:
   a gear system coupled to said frame assembly, said gear system having a plurality of gears being operationally coupled to said left back wheel and said right back wheel; and
   a gear switch coupled to said frame assembly, said gear switch being operationally coupled to said gear system for selectively switching gears.

6. The assembly of claim 4, further including said drive system having a motor coupled to said frame assembly, said motor being operationally coupled to said main axle.

7. The assembly of claim 6, further including a throttle control coupled to said frame assembly, said throttle control being operationally coupled to said motor.

8. The assembly of claim 1, further comprising:
   a left front fork pivotally coupled to said left frame, said left front wheel being coupled to said left front fork;
   a right front fork pivotally coupled to said right frame, said right front wheel being coupled to said right front fork;

said steering mechanism including a left handle pivotally coupled to said left frame and a right handle pivotally coupled to said right frame;

said steering mechanism including a left steering rod having a first end coupled to an end of said left handle and a second end coupled to said left front fork whereby pivoting of said left handle pivots said left front fork relative to said left frame; and said steering mechanism including a right steering rod having a first end coupled to an end of said right handle and a second end coupled to said right front fork whereby pivoting of said right handle pivots said right front fork relative to said right frame.

9. The assembly of claim 8, further including a tie rod having a first end pivotally coupled to said left front fork and a second end pivotally coupled to said right front fork, said tie rod being positioned offset from a pivot point of said left front fork and a pivot point of said right front fork whereby pivoting of said left front fork and said right front fork is coordinated.

10. The assembly of claim 1, further including a plurality of lights coupled to said frame assembly.

11. The assembly of claim 10, further including a turn switch coupled to said frame assembly, said turn switch being operationally coupled to each of said lights whereby manipulation of said turn switch selectively activates said lights.

12. The assembly of claim 1, further including a rear brake assembly coupled to said frame assembly, said rear brake assembly having rear calipers coupled to said frame assembly, said rear calipers being positioned adjacent to said left back wheel and said right back wheel, said rear calipers selectively engaging said left back wheel and said right back wheel whereby rotation of said left back wheel and said right back wheel is inhibited, said rear brake assembly having a rear brake actuator coupled to one of a left handle and a right handle, said rear brake actuator being operationally coupled to said rear calipers.

13. The assembly of claim 1, further including a front brake assembly coupled to said frame assembly, said front brake assembly having front calipers coupled to said frame assembly, said front calipers being positioned adjacent to said left front wheel and said right front wheel, said front calipers selectively engaging said left front wheel and said right front wheel whereby rotation of said left front wheel and said right front wheel is inhibited, said front brake assembly having a front brake actuator coupled to one of a left handle and a right handle, said front brake actuator being operationally coupled to said front calipers.

14. The assembly of claim 1, further including a left minor coupled to said left frame and a right mirror coupled to said right frame.

15. A vehicle assembly comprising:
a frame assembly having a left frame coupled to a right frame, said left frame and said right frame being laterally aligned, said frame assembly having a center frame coupled to and positioned between said left frame and said right frame;
a plurality of wheels coupled to said frame assembly, said plurality of wheels including a left front wheel and a left back wheel coupled to said left frame, said plurality of wheels including a right front wheel and a right back wheel coupled to said right frame, said left back wheel and said right back wheel being laterally aligned wherein said left back wheel and said right back wheel have a common central axis;
a left front fork pivotally coupled to said left frame, said left front wheel being coupled to said left front fork;
a right front fork pivotally coupled to said right frame, said right front wheel being coupled to said right front fork;
a seat assembly coupled to said frame assembly, said seat assembly being positioned between said left frame and said right frame;
a steering mechanism coupled to said frame assembly, said steering mechanism being mechanically coupled to said left front wheel and said right front wheel; and
a drive system coupled to said frame assembly, said drive system being operationally coupled to said left back wheel and said right back wheel;
a platform coupled to said frame assembly, said platform being positioned between said left frame and said right frame and aligned between said left back wheel and said right back wheel, said platform extending rearwardly of said seat assembly;
a bucket seat of said seat assembly being aligned with said center frame, said bucket seat being positioned over a forward portion of said platform, a back portion of said bucket seat extending upwardly relative to said platform, said back portion of said seat being positioned directly between said left back wheel and said right back wheel forward of said common central axis of said left back wheel and said right back wheel;
a pair of pedals of said drive system being coupled to said center frame;
a main axle of said drive system being coupled to said frame assembly, said main axle being operationally coupled to said pedals whereby said pedals urge said main axle to rotate, said main axle being operationally coupled to said left back wheel and said right back wheel;
a gear system coupled to said frame assembly, said gear system having a plurality of gears being operationally coupled to said left back wheel and said right back wheel;
a gear switch coupled to said frame assembly, said gear switch being operationally coupled to said gear system for selectively switching gears;
a motor coupled of said drive system being to said frame assembly, said motor being operationally coupled to said main axle;
a throttle control coupled to said frame assembly, said throttle control being operationally coupled to said motor;
a left handle of said steering mechanism being pivotally coupled to said left frame;
a right handle of said steering mechanism being pivotally coupled to said right frame;
a left steering rod of said steering mechanism having a first end coupled to a lower end of said left handle, said left steering rod having a second end coupled to said left front fork whereby pivoting of said left handle pivots said left front fork relative to said left frame;
a right steering rod of said steering mechanism having a first end coupled to a lower end of said right handle, said right steering rod having a second end coupled to said right front fork whereby pivoting of said right handle pivots said right front fork relative to said right frame;
a tie rod having a first end pivotally coupled to said left front fork and a second end pivotally coupled to said right front fork, said tie rod being positioned offset from a pivot point of said left front fork and a pivot point of said right front fork whereby pivoting of said left front fork and said right front fork is coordinated;

a plurality of lights coupled to said frame assembly;
a turn switch coupled to said frame assembly, said turn switch being operationally coupled to each of said lights whereby manipulation of said turn switch selectively activates said lights;
a rear brake assembly coupled to said frame assembly, said rear brake assembly having rear calipers coupled to said frame assembly, said rear calipers being positioned adjacent to said left back wheel and said right back wheel, said rear calipers selectively engaging said left back wheel and said right back wheel whereby rotation of said left back wheel and said right back wheel is inhibited;
a rear brake actuator of said rear brake assembly being coupled to said right handle, said rear brake actuator being operationally coupled to said rear calipers;
a front brake assembly coupled to said frame assembly, said front brake assembly having front calipers coupled to said frame assembly, said front calipers being positioned adjacent to said left front wheel and said right front wheel, said front calipers selectively engaging said left front wheel and said right front wheel whereby rotation of said left front wheel and said right front wheel is inhibited;
a front brake actuator of said front brake assembly being coupled to said left handle, said front brake actuator being operationally coupled to said front calipers;
a left mirror coupled to said left frame; and
a right minor coupled to said right frame.

\* \* \* \* \*